(12) United States Patent
Yu

(10) Patent No.: US 10,471,298 B2
(45) Date of Patent: Nov. 12, 2019

(54) SWINGABLE MECHANICAL STRUCTURE

(71) Applicant: Ming-Yang Yu, New Taipei (TW)

(72) Inventor: Ming-Yang Yu, New Taipei (TW)

( * ) Notice: Subject to any disclaimer, the term of this patent is extended or adjusted under 35 U.S.C. 154(b) by 91 days.

(21) Appl. No.: 15/942,184

(22) Filed: Mar. 30, 2018

(65) Prior Publication Data

US 2019/0299051 A1    Oct. 3, 2019

(51) Int. Cl.
*A63B 22/00* (2006.01)
*F16H 25/16* (2006.01)
*A63B 22/18* (2006.01)
*A63B 22/16* (2006.01)
*A63B 69/16* (2006.01)
*A63B 23/04* (2006.01)
*A63B 22/06* (2006.01)

(52) U.S. Cl.
CPC ...... *A63B 22/0087* (2013.01); *A63B 22/0046* (2013.01); *A63B 22/0605* (2013.01); *A63B 22/18* (2013.01); *F16H 25/16* (2013.01); *A63B 22/06* (2013.01); *A63B 23/0476* (2013.01); *A63B 69/16* (2013.01)

(58) Field of Classification Search
CPC ..... A63B 22/06; A63B 22/0605; A63B 22/18; A63B 2022/0611–0658; A63B 69/16; A63B 2069/161–168; A63B 23/0476; A63B 37/10; A63B 2022/0074; F16H 25/16
See application file for complete search history.

(56) References Cited

U.S. PATENT DOCUMENTS

| 3,758,107 | A | * | 9/1973 | Potgieter | A63B 22/0605 482/63 |
| 5,050,865 | A | * | 9/1991 | Augspurger | A63B 24/00 482/2 |
| 5,630,774 | A | * | 5/1997 | Geschwender | B62K 3/002 280/267 |
| 6,712,737 | B1 | * | 3/2004 | Nusbaum | A63B 69/16 482/57 |
| 7,927,258 | B2 | * | 4/2011 | Irving | A63B 21/015 482/57 |
| 8,092,352 | B2 | * | 1/2012 | Irving | A63B 21/225 482/57 |
| 10,039,954 | B1 | * | 8/2018 | Tung | A63B 22/0605 |
| 10,071,298 | B1 | * | 9/2018 | McCormack | A63B 69/16 |

(Continued)

*Primary Examiner* — Nyca T Nguyen
(74) *Attorney, Agent, or Firm* — Muncy, Geissler, Olds & Lowe, P.C.

(57) ABSTRACT

A swingable mechanical structure installed to fitness equipment or bicycles includes a machine base, a swing mechanism, and an auxiliary bracket. The swing mechanism includes a rotating shaft, a tilt member, and a swing post. The rotating shaft of the swing mechanism is installed into an assembling slot of the rotating shaft. Both ends of the auxiliary bracket are assembled to the machine base and an end of the swing post. When the rotating shaft is rotated, the rotating shaft is rotated to an angle with the respect to the tilt member, so that the swing post may swing together with the tilt member sideway and rotated around the tilt member. One of the ends of the swing post is limited by the auxiliary bracket, so that the swing post can just swing sideway to produce a mechanical structure with a force input and output conversion.

11 Claims, 17 Drawing Sheets

(56) References Cited

U.S. PATENT DOCUMENTS

| | | | |
|---|---|---|---|
| 2001/0031686 A1* | 10/2001 | Ware | A63B 21/015 482/57 |
| 2002/0004439 A1* | 1/2002 | Galbraith | A63B 22/0605 482/57 |
| 2005/0209064 A1* | 9/2005 | Peterson | A63B 22/16 482/61 |
| 2006/0035758 A1* | 2/2006 | Rogozinski | A63B 22/0015 482/57 |
| 2007/0049467 A1* | 3/2007 | Lin | A63B 21/015 482/57 |
| 2007/0054782 A1* | 3/2007 | Lin | A63B 21/015 482/57 |
| 2007/0072744 A1* | 3/2007 | Badarneh | A63B 26/003 482/57 |
| 2008/0020908 A1* | 1/2008 | Ibarguren | A63B 22/0605 482/57 |
| 2008/0269025 A1* | 10/2008 | Badarneh | A63B 26/003 482/57 |
| 2009/0170667 A1* | 7/2009 | Irving | A63B 21/225 482/57 |
| 2010/0081548 A1* | 4/2010 | Labedz | A63B 22/0605 482/4 |
| 2010/0130331 A1* | 5/2010 | Hu | A63B 22/0046 482/57 |
| 2011/0237397 A1* | 9/2011 | Mabey | A63B 22/0605 482/4 |
| 2012/0071301 A1* | 3/2012 | Kaylor | A63B 21/00058 482/57 |
| 2012/0302403 A1* | 11/2012 | Touret | A63B 24/00 482/4 |
| 2013/0123074 A1* | 5/2013 | Jun | A63B 21/00196 482/57 |
| 2013/0130798 A1* | 5/2013 | Nir | A63F 13/245 463/36 |
| 2014/0087923 A1* | 3/2014 | Warren | A63B 23/0476 482/57 |
| 2015/0238808 A1* | 8/2015 | Lin | A63B 22/0605 482/57 |
| 2015/0290490 A1* | 10/2015 | Badarneh | A63B 22/0023 482/6 |
| 2017/0136293 A1* | 5/2017 | Caccia | A63B 69/16 |
| 2018/0117383 A1* | 5/2018 | Workman | A63B 21/00069 |
| 2019/0070456 A1* | 3/2019 | Tung | A63B 22/0605 |

* cited by examiner

SWINGABLE MECHANICAL STRUCTURE

BACKGROUND OF THE INVENTION

(a) Field of the Invention

The present invention relates to a swingable mechanical structure, and more particularly to the swingable mechanical structure assembled to a riding tool such as a fitness machine or a bicycle to provide a swing function.

(b) Description of the Related Art

Many people are attracted to various indoor recreations which lead to a lack of exercise, so that some people may choose the use of fitness equipment to achieve the exercise effect. Most existing fitness machines are designed for jogging, cycling, or stretching motions, and a traditional indoor fitness bike is mainly operated by a stepping motion performed by an exerciser's legs to achieve the effect of exercising both legs, similar to the exercise of riding a bicycle. Of course, the fitness bike may be equipped with a resistance adjusting device used for adjusting friction, so that users may adjust the friction to a level most appropriate to them in order to achieve the expected exercise effect. Although exercises of this sort consume a specific amount of calories, it is difficult to provide an effective way to exercise the users' waist. Obviously, such exercise just provides an operation or an exercise mode of stepping on the pedals only. Obviously, the users may feel monotonous and lack of interest, and thus failing to achieve the expected exercise result. Therefore, finding a way to combine the mechanical structure with other components to achieve a better exercise result demands immediate attentions and feasible solutions.

SUMMARY OF THE INVENTION

Therefore, it is a primary objective of the present disclosure to provide a swingable mechanical structure to overcome the drawbacks of the prior art.

To achieve the aforementioned and other objectives, present disclosure provides a swingable mechanical structure comprising a machine base, a swing mechanism, and an auxiliary bracket, wherein the swing mechanism is comprised of a rotating shaft, a tilt member, and a swing post, and the rotating shaft of the swing mechanism is installed in an assembling slot of the machine base, and a first axis is defined along the central axis of the rotating shaft; the tilt member is sheathed on the rotating shaft and intersected with the center line of the rotating shaft to define an angle, and such angle may be a fixed angle or a variable angle, and the minimum variable angle may be zero, and a second axis is defined along the central line of the tilt member, and the swing post is sheathed on the tilt member and rotated and swung with respect to the tilt member but not moved axially with respect to the tilt member, and a third axis is defined along the central axis of the swing post, and the third axis passes through the point of intersection of the first axis and the second axis; a rotating portion and an assembling portion are disposed at both ends of the auxiliary bracket respectively, and the rotating portion is passed through the swing post for an appropriate rotation, and a fourth axis is defined along the central axis of the swing post, and the fourth axis passes through the point of intersection of the first axis, second axis, and third axis, and the assembling portion is sheathed on the swing post and rotated appropriately with respect to the central axis of the swing post. When a force is applied to the rotating shaft of the machine base to rotate the tilt member to an angle with respect to the rotating shaft, the swing post sheathed on the tilt member may swing together with the tilt member and rotate around the tilt member, and an end of the swing post is limited by the auxiliary bracket, so that the swing post can just swing sideway to form a mechanical structure with a force input and output conversion.

DETAILED DESCRIPTION OF THE PREFERRED EMBODIMENT

The technical measures and characteristics of the present disclosure will become clearer in light of the following detailed description of an illustrative embodiment of this disclosure described in connection with the drawings.

With reference to FIGS. 1 to 7 for a swing mechanism 11 of this disclosure, the swing mechanism 11 comprises a rotating shaft 112, a tilt member (114, 115), and a swing post 110.

Figure 3:
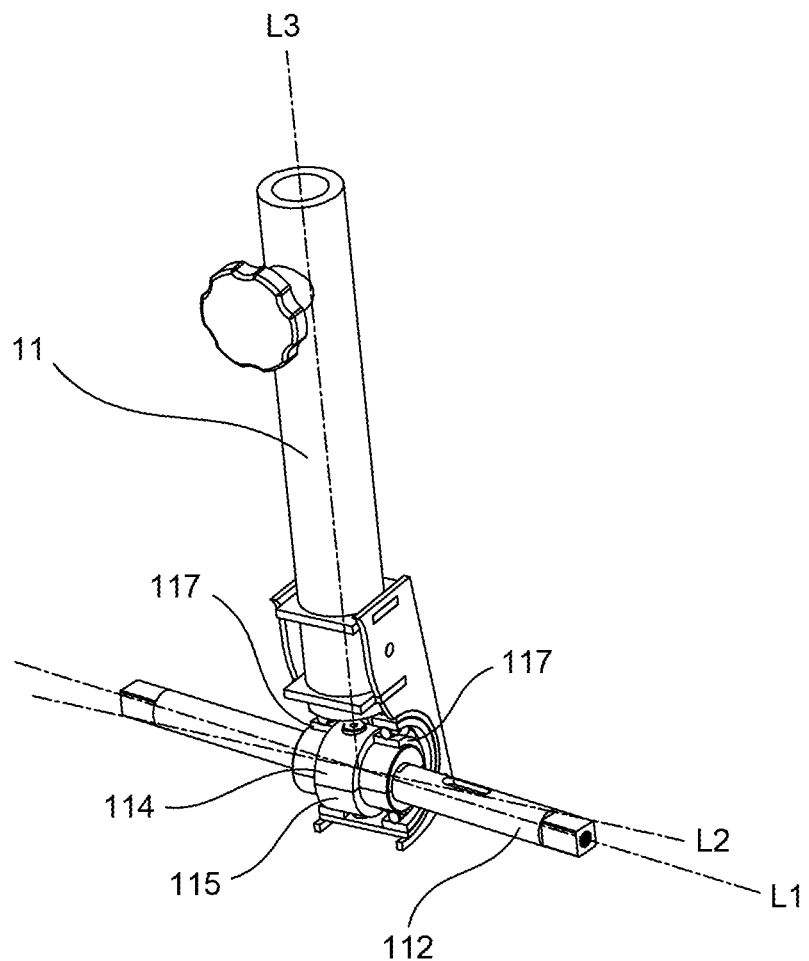
FIG. 3 is a first perspective view of a swing mechanism of the present disclosure.
Figure 4:
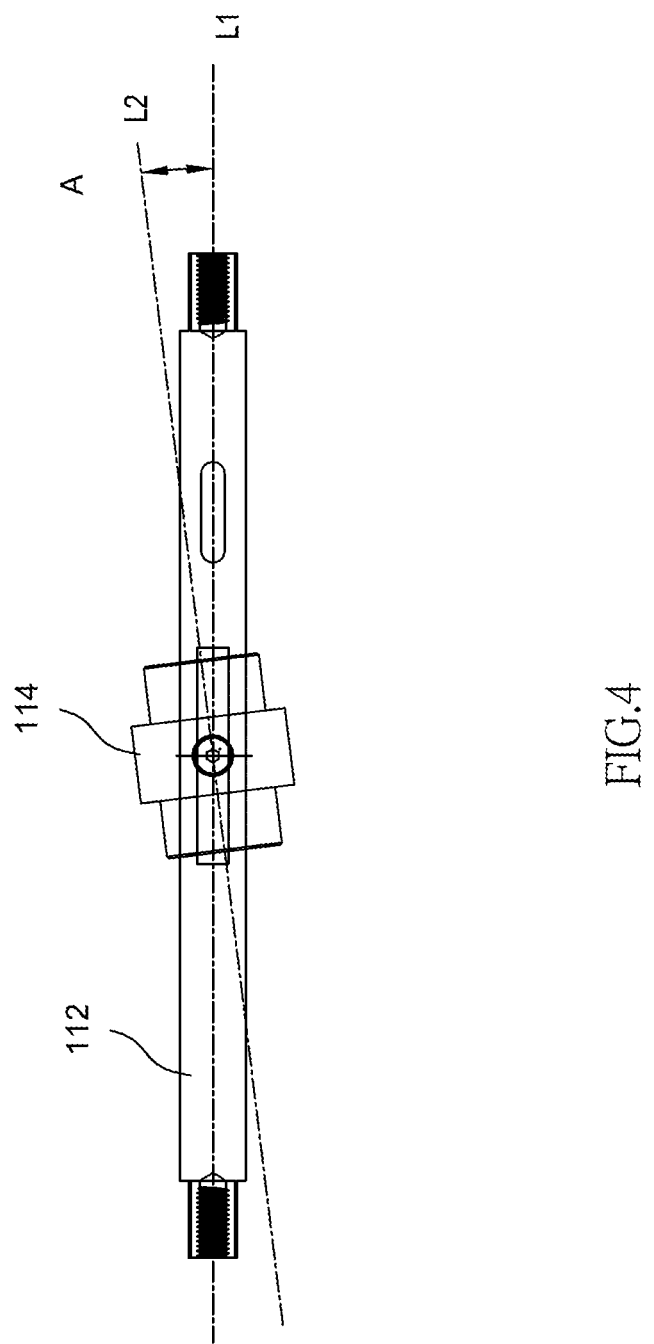
FIG. 4 is a second schematic view of a swing mechanism of the present disclosure.
Figure 5:
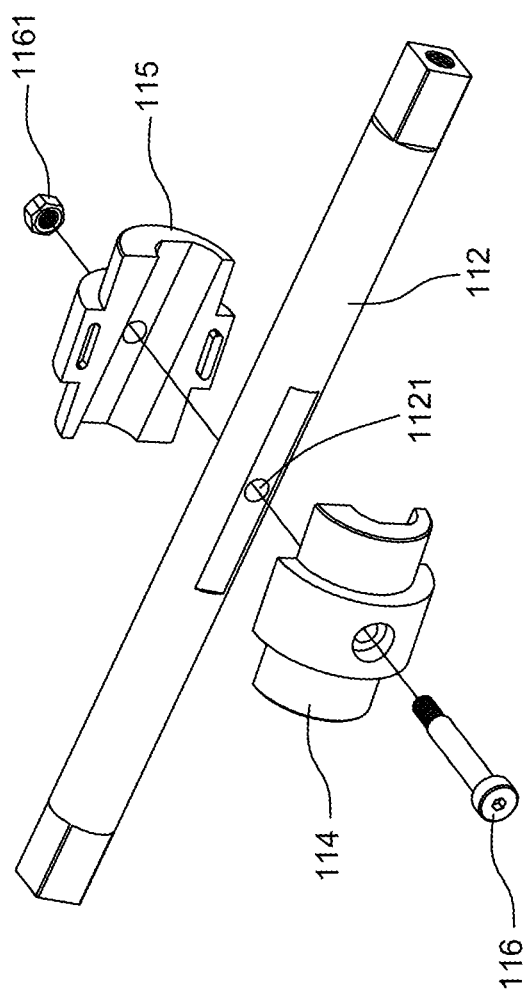
FIG. 5 is a third schematic view of a swing mechanism of the present disclosure.
Figure 6:
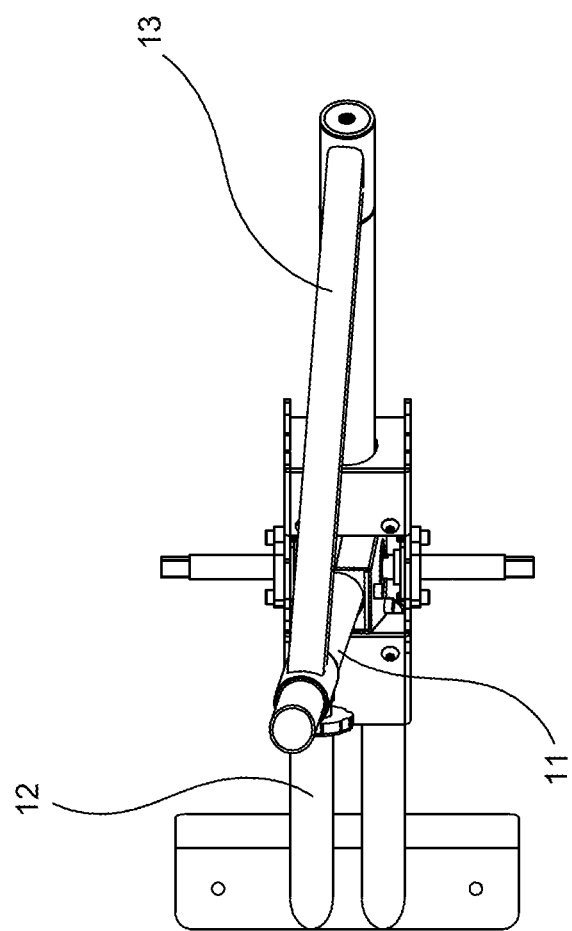
FIG. 6 is a first schematic view showing a swing motion of the present disclosure.
Figure 7:
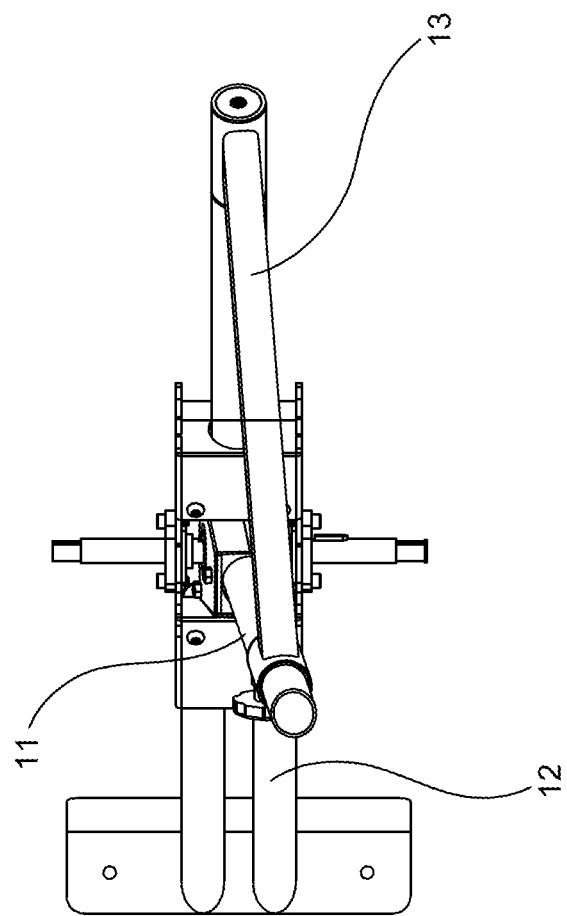
FIG. 7 is a second schematic view showing a swing motion of the present disclosure.
Figure 8:
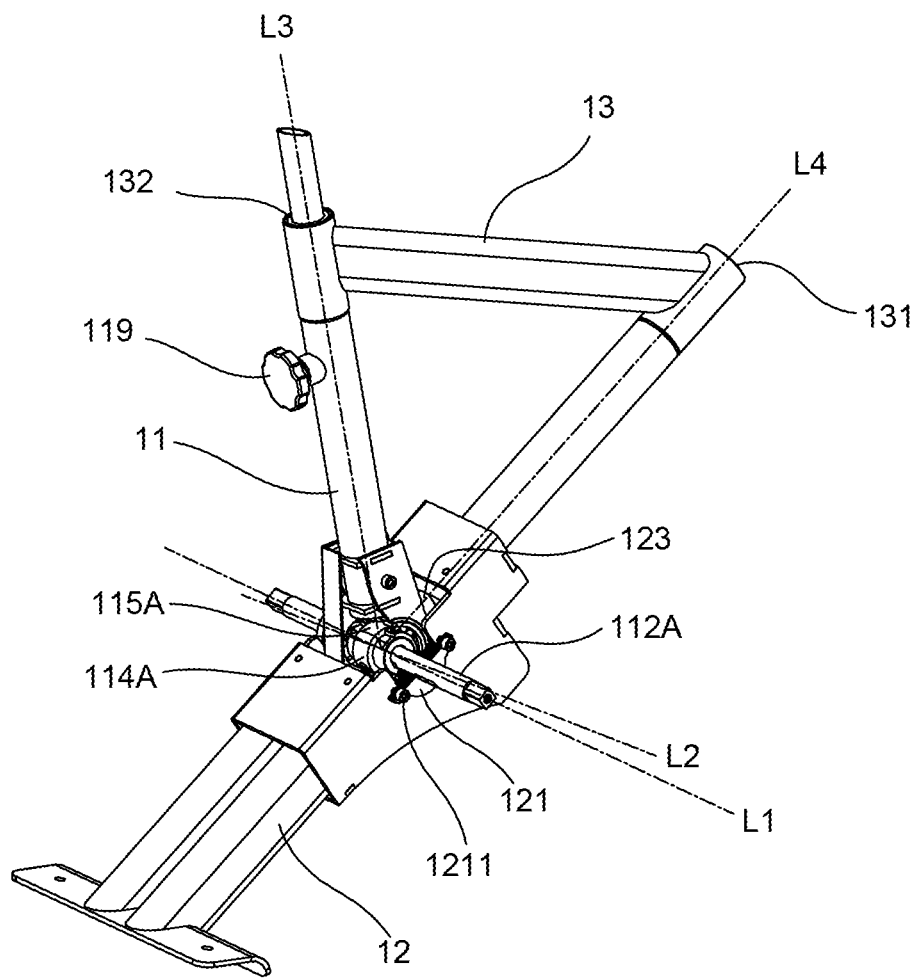
FIG. 8 is a perspective view of an embodiment of the present disclosure.
Figure 9:
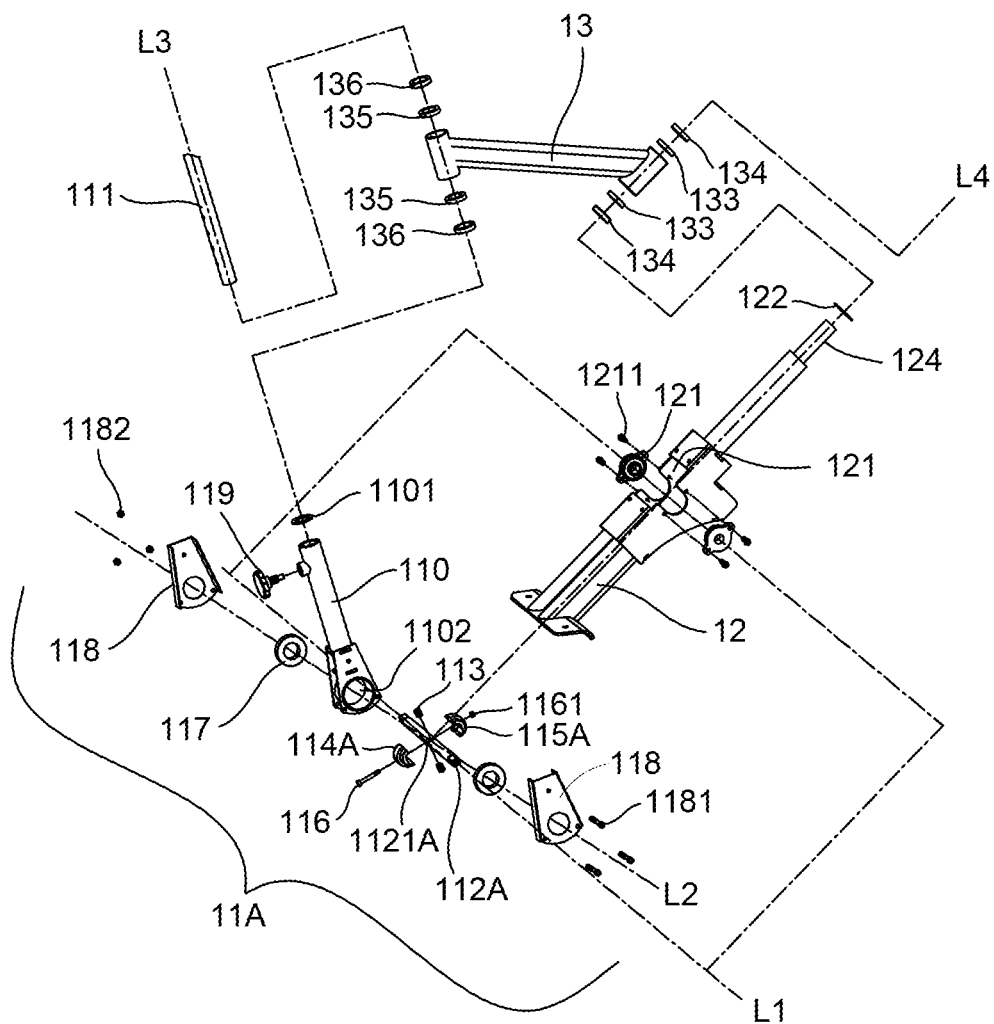
FIG. 9 is an exploded view of an embodiment of the present disclosure.

The tilt member (114, 115) and the rotating shaft 112 are assembled by a fixing screw 116 and a fixing nut 1161, and the tilt members (114, 115) may be integrally formed or composed of two separate components, and a first axis L1, a second axis L2, and a third axis L3 are defined along the central axes of the rotating shaft 112, the tilt member (114, 115), and the swing post 110 respectively, and the third axis L3 passes through the point of intersection of the first axis L1 and the second axis L2 and configured to be perpendicular to the second axis L2, and the center line of the tilt member (114, 115) and the center line of the rotating shaft 112 are intersected to define an angle A. In FIGS. 4 and 5, two bearings 117 are plugged into both ends of the tilt member (114, 115) respectively, and then placed into the through hole 1102 of the swing post 110, and the two fixing plates 118 are disposed on the outer sides of the bearings 117 respectively, and then fixed by a fixing bolt 1181 and a fixing nut 1182. The assembled swing mechanism 11 is shown in FIG. 3. In addition, two bearings 121 are plugged into both ends of the rotating shaft 112 of the swing mechanism 11 respectively, and then placed into the assembling slot 123 of the machine base 12, and the fixing bolt 1211 is provided for fixing the bearing 121 onto the machine base 12.

Figure 1:
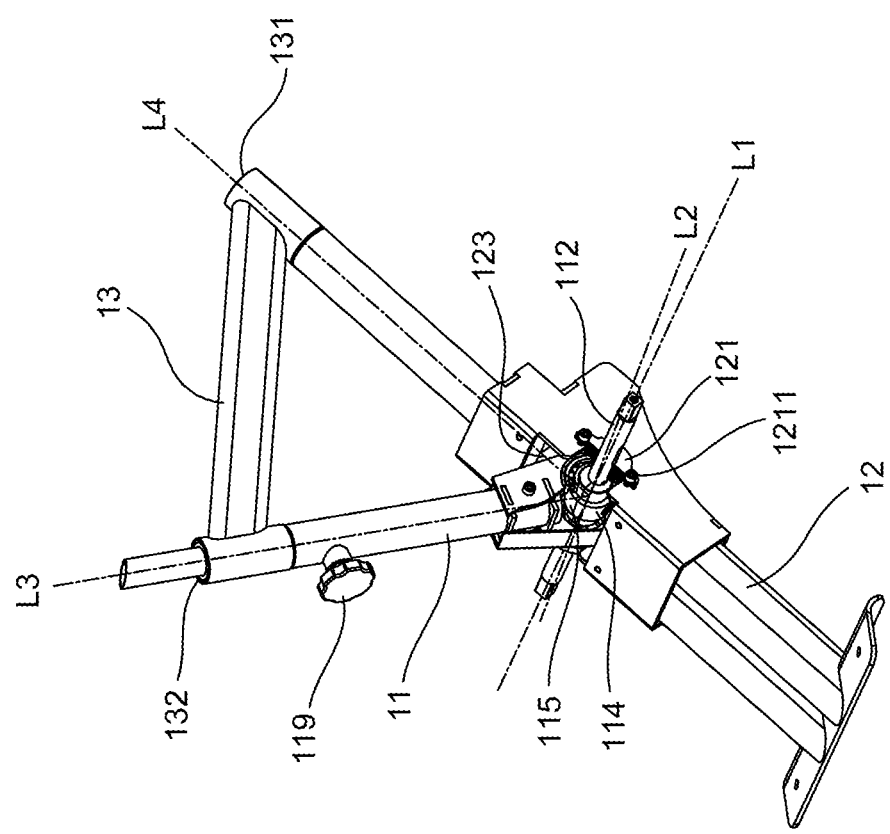
FIG. 1 is a first perspective view of the present disclosure.
Figure 2:
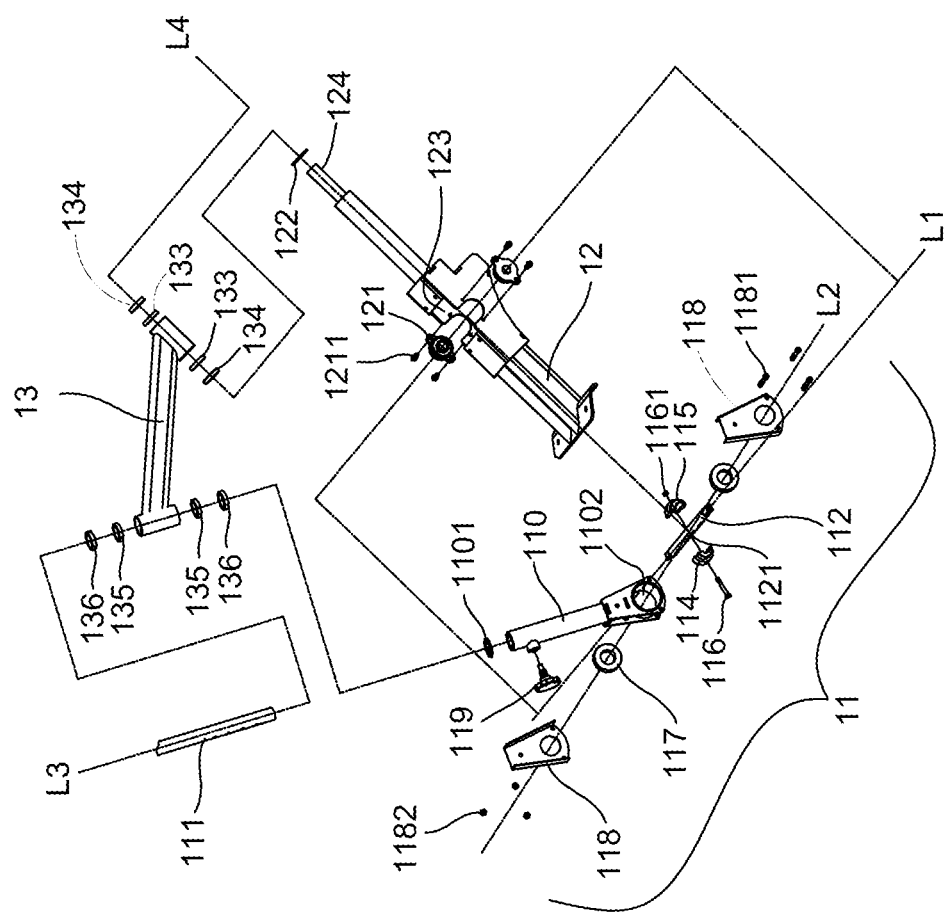
FIG. 2 is a first exploded view of the present disclosure.

An auxiliary bracket 13 is comprised of a rotating portion 131, a bearing 133 and a fixing plug 134, and the assembling portion 132, bearing 135 and fixing plug 136 are assembled and then a gasket 122 is placed into a rotating end 124 of the machine base 12 and plugged into the rotating portion 131 of the auxiliary bracket 13, and the center line of the rotating end 124 and the center line of the rotating shaft 112 are intersected, and a fourth axis L4 is defined along the central axis of the rotating end 124, and the fourth axis L4 passes through the point of intersection of the first axis L1, the second axis L2, and the third axis L3, and then the assembling portion 132 of the auxiliary bracket 13 is aligned precisely with the upper end of the swing post 110 of the swing mechanism 11, and a gasket 1101 is inserted into their gap, and then a pillar 111 is passed from top to bottom into the assembling portion 132 of the auxiliary bracket 13 and the gasket 1101, and then a fixing member 119 is provided for fixing the pillar 111 onto the swing post 110. The aforementioned components are assembled to produce the swingable mechanical structure 1 of this disclosure as shown in FIG. 1.

Figure 10:
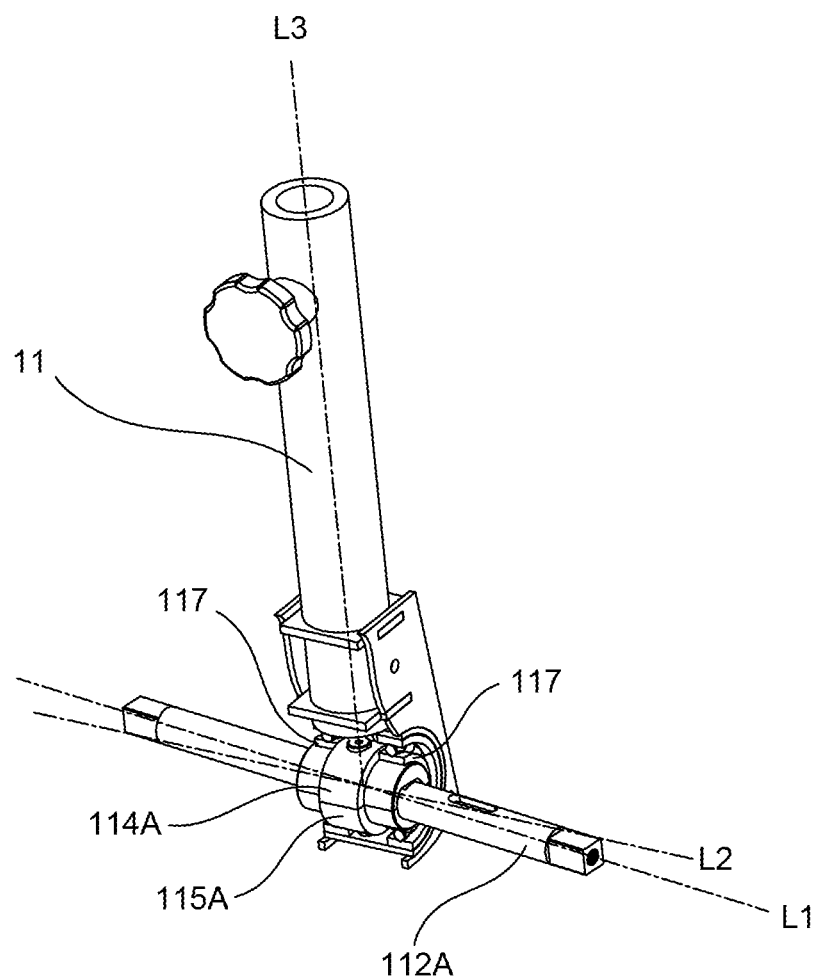
FIG. 10 is a first perspective view of a swing mechanism in accordance with an embodiment of the present disclosure.
Figure 11:
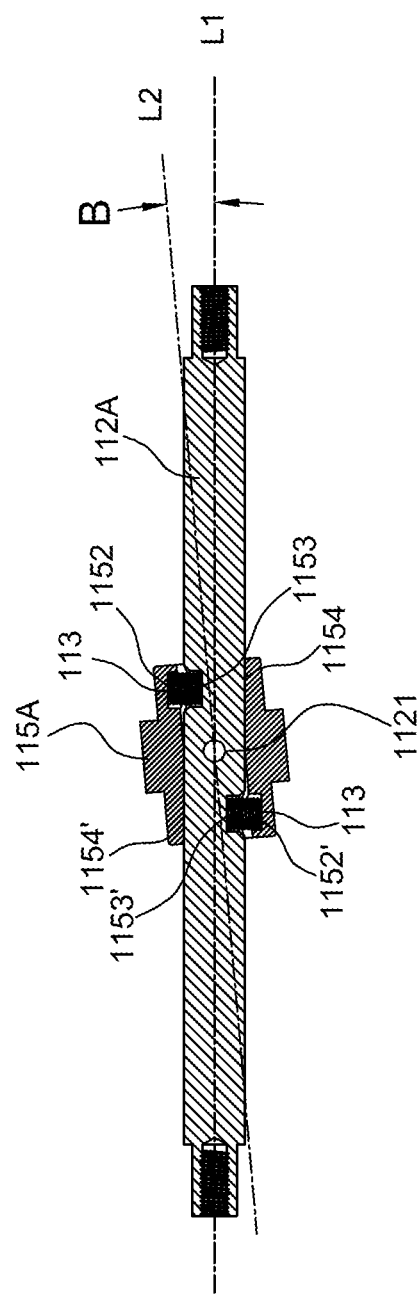
FIG. 11 is a second perspective view of a swing mechanism in accordance with an embodiment of the present disclosure.
Figure 12:
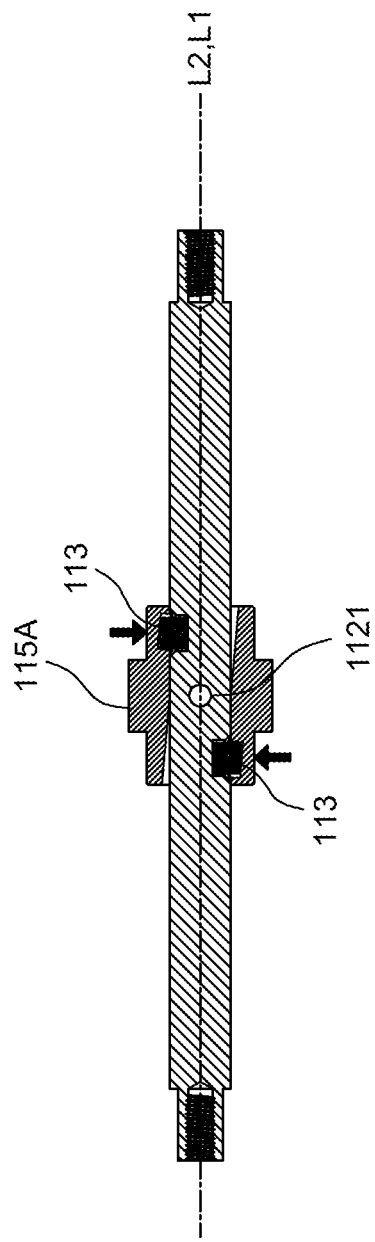
FIG. 12 is a third perspective view of a swing mechanism in accordance with an embodiment of the present disclosure.
Figure 13:
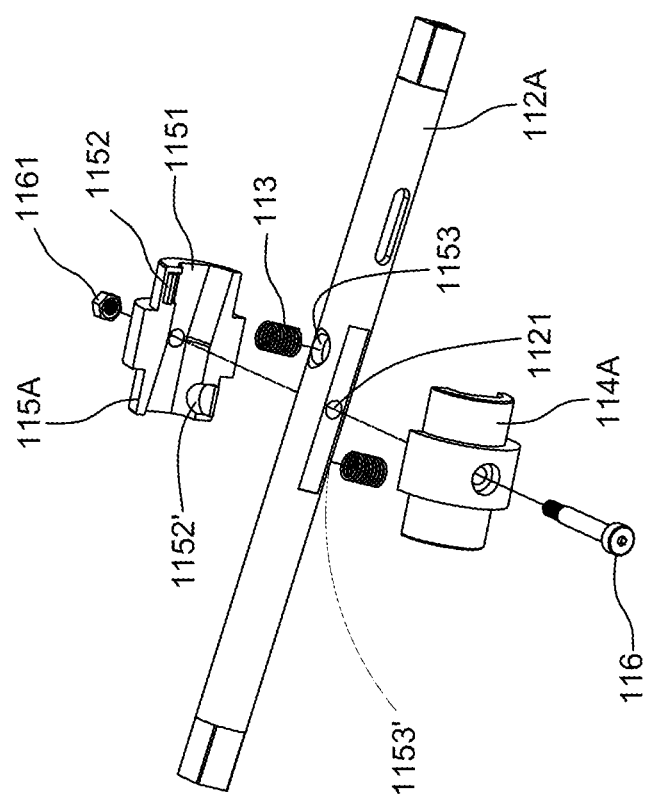
FIG. 13 is a fourth perspective view of a swing mechanism in accordance with an embodiment of the present disclosure.

In FIGS. 8 to 13, the swing mechanism 11A comprises a rotating shaft 112A, a tilt member (114A, 115A), and a swing post 110, and the tilt members (114A, 115A) may be integrally formed or composed of two separate components, and a first axis L1, a second axis L2, and a third axis L3 are defined along the central axes of the rotating shaft 112A, a tilt member (114A, 115A), and a swing post 110 respectively, and the third axis L3 passes through the point of intersection of the first axis L1 and the second axis L2 and perpendicular to the second axis L2, wherein a fixing screw 116 is inserted into the tilt member (114A, 115A) and the through hole 1121 of the rotating shaft 112A in advance, and an elastic member 113 is installed between the first positioning hole 1152 of the tilt member (114A, 115A) and the first relative positioning hole 1153 of the rotating shaft 112A, and between the second positioning hole 1152' of the tilt member (114A, 115A) and the second relative positioning hole 1153' of the rotating shaft 112A, and then a fixing nut 1161 and a fixing screw are provided to complete the fixing and assembling processes. After the propping portions 1154, 1154' of the tilt members (114A, 115A) abut against the rotating shaft 112A, the tilt members (114A, 115A) and the rotating shaft 112A define an included angle B for an elastic rotation as shown in FIGS. 11 to 13, and then the two bearings 117 are plugged into both ends of the tilt members (114A, 115A) and placed into the through hole 1102 of the swing post 110, and the two fixing plates 118 are installed to the outer sides of the bearing 117 respectively, and a fixing screw 1181 and a fixing nut 1182 are provided for the fixing process, and the assembled swing mechanism 11A is shown in FIG. 10. The two bearings 121 are plugged into both ends of the rotating shaft 112A of the swing mechanism 11A and then placed into an assembling slot 123 of the machine base 12, and finally a fixing bolt 1211 is provided for fixing the bearing 121 to the machine base 12. The auxiliary bracket 13 is assembled with the rotating portion 131, bearing 133 and fixing plug 134, and the assembling portion 132 is assembled with the bearing 135 and fixing plug 136, and then the gasket 122 is installed onto the rotating end 124 of the machine base 12, and the rotating portion 131 of the auxiliary bracket 13 is inserted, and a fourth axis L4 is defined along the central axis of the rotating end 124, and the fourth axis L4 passes through the point of intersection of the first axis L1, second axis L2, and third axis L3, and the assembling portion 132 of the auxiliary bracket 13 is aligned precisely with the upper end of the swing post 110 of the swing mechanism 11A, and the gasket 1101 is plugged into their gap, and then a pillar 111 is inserted from top to bottom into the assembling portion 132 of the auxiliary bracket 13 and the gasket 1101, and then a fixing member 119 is provided for fixing the pillar 111 onto the swing post 110 to complete the swingable mechanical structure 1A.

Figure 14:
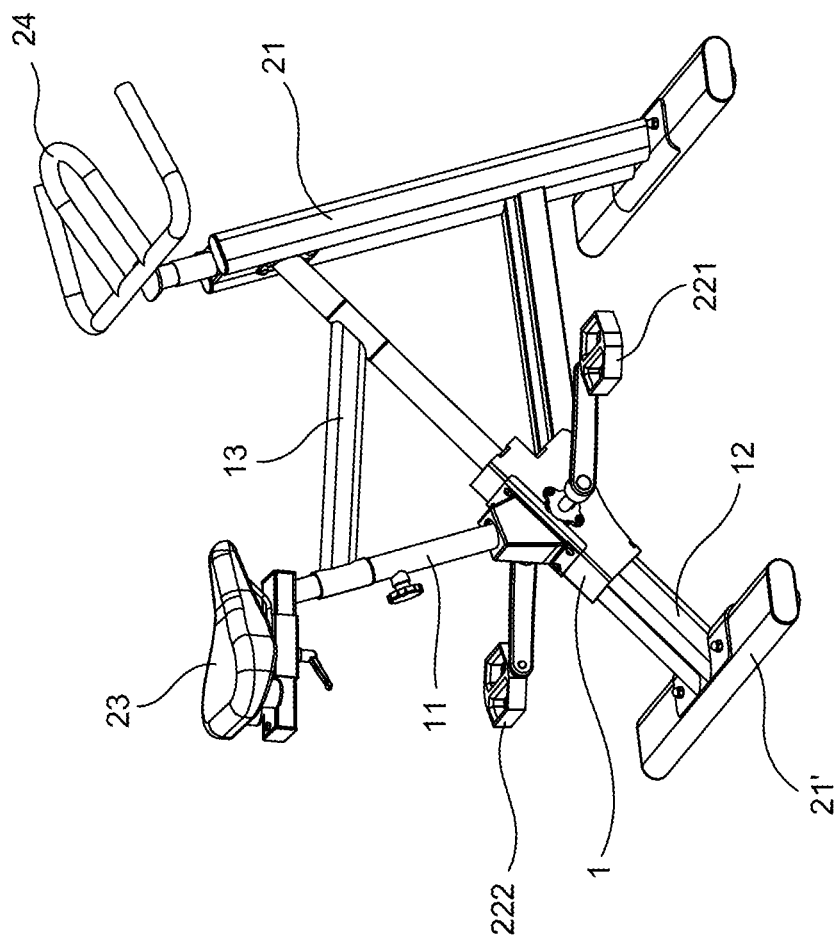
FIG. 14 is a first schematic view of an operation of the present disclosure.
Figure 15:
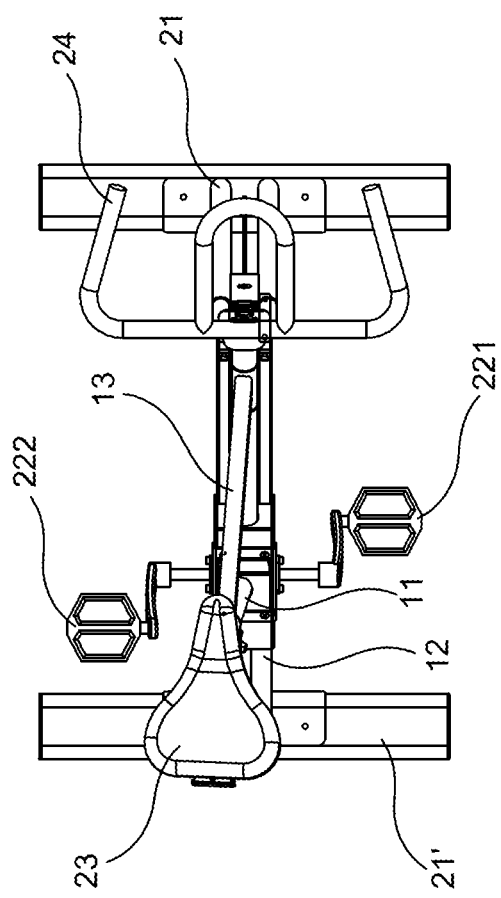
FIG. 15 is a second schematic view of an operation of the present disclosure.
Figure 16:
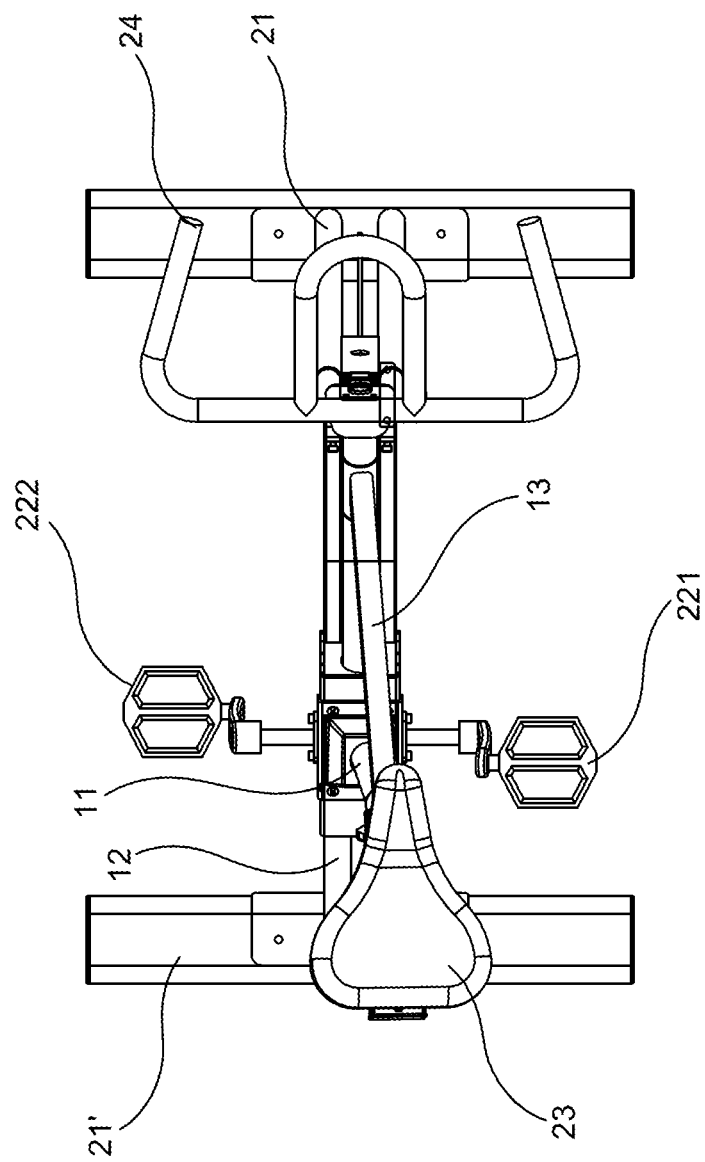
FIG. 16 is a third schematic view of an operation of the present disclosure.
Figure 17:
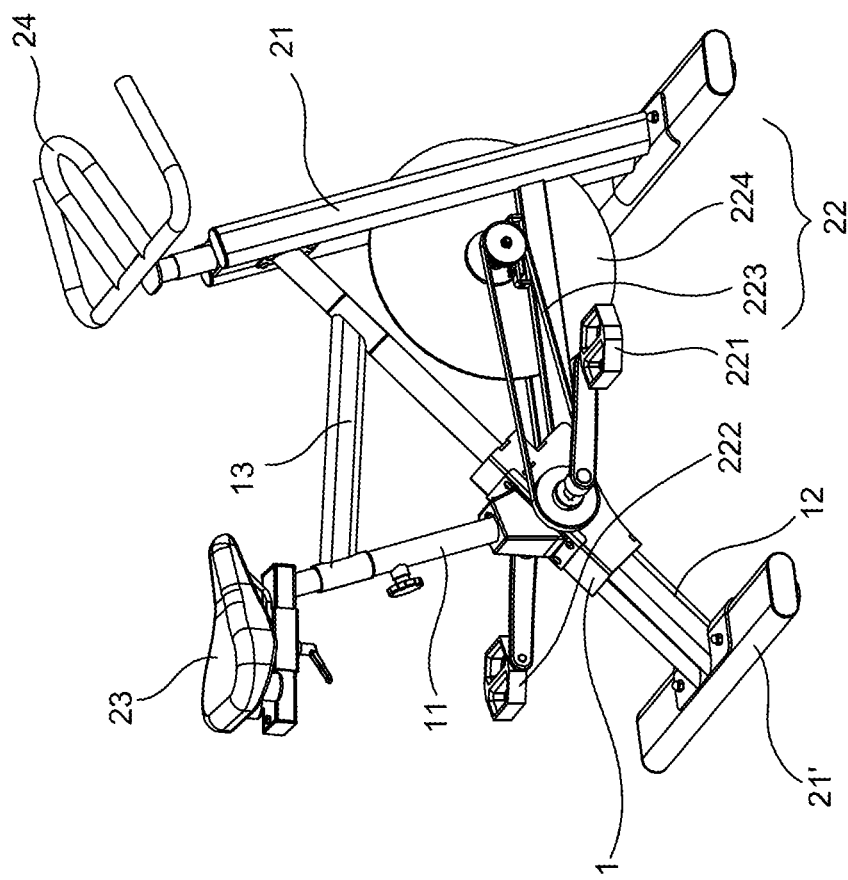
FIG. 17 is a schematic view of another embodiment of the present disclosure.

In FIGS. 14 to 16, the swingable mechanical structure of this disclosure may be combined with a riding tool such as a fitness equipment or a bicycle to provide the swing effect as shown in FIG. 14. The swingable mechanical structure 1 is assembled with a support base (21, 21'), a seat 23, and an armrest 24, and both sides of the swingable mechanical structure have a pedal (221, 222) each. When the pedals (221, 222) are stepped, the seat 23 swings sideway with respect to the machine base 12 by the swing mechanism 11 to achieve the swing fitness effect. In FIG. 17, the swingable mechanical structure 1 is assembled with a support base (21, 21'), a seat 23, and an armrest 24, and a transmission mechanism 22 comprised of a belt 223 and a flywheel 224 is added and assembled with the support base (21, 21'). When the pedals (221, 222) are stepped, the seat 23 swings sideway with respect to the machine base 12 by the swing mechanism 11 to achieve the swing fitness effect.

While the present disclosure has been described by preferred embodiments in conjunction with accompanying drawings, it should be understood that the embodiments and the drawings are merely for descriptive and illustrative purpose, not intended for restriction of the scope of the present disclosure. Equivalent variations and modifications performed by person skilled in the art without departing from the spirit and scope of the present disclosure should be considered to be still within the scope of the present disclosure.

What is claimed is:
1. A swingable mechanical structure, assembled to a riding tool to provide a swing function, comprising:
   a machine base, having an assembling slot, and a rotating end formed at one of the ends of the machine base;
   a swing mechanism, installed in the assembling slot, and comprised of a rotating shaft, a tilt member and a swing post, and having a first axis defined along the central axis of the rotating shaft, and the tilt member being sheathed on the rotating shaft, so that the tilt member is intersected with a center line of the rotating shaft to form an angle, and a second axis being defined along the central axis of the tilt member, and the swing post being installed outside the tilt member and swinging with respect to the rotation of the tilt member and not moving axially with respect to the tilt member, and a third axis being defined along the central axis of the swing post and passing through the point of intersection of the first axis and the second axis and being perpendicular to the second axis;

an auxiliary bracket, having a rotating portion and an assembling portion disposed at both ends of the auxiliary bracket respectively, and the rotating portion passing through the rotating end of the machine base and capable of rotating appropriately, and a center line of the rotating end being intersected with the center line of the rotating shaft, and a fourth axis being defined along the central axis of the rotating end and passing through the point of intersection of the first axis, the second axis, and the third axis, and the assembling portion being sheathed on the swing post and capable of rotating appropriately with respect to the central axis of the swing post;

whereby, when a force is applied to rotate the rotating shaft of the machine base, the tilt member is swung and rotated, and the swing post sheathed on the tilt member is swung sideway with the tilt member and rotated around the tilt member, and an end of the swing post is limited by the auxiliary bracket, so that the swing post is configured to just swing sideway to form a mechanical structure with a force input and output conversion.

2. The swingable mechanical structure of claim 1, wherein a center line of the tilt member and the center line of the rotating shaft are intersected to define a fixed angle.

3. The swingable mechanical structure of claim 2, wherein the swingable mechanical structure is assembled with a support base, a seat, an armrest, and two stepping members, and when the two stepping members are stepped, the seat produces a sideway swing with respect to the machine base by the swing mechanism.

4. The swingable mechanical structure of claim 3, wherein a transmission mechanism is installed onto the support base, and the transmission mechanism is comprised of a driving belt and a flywheel, and the driving belt is coupled to the flywheel and one of the stepping members, and the two stepping members are stepped to drive the driving belt to link and rotate the flywheel.

5. The swingable mechanical structure of claim 1, wherein the tilt member is fixed to the rotating shaft by a fixing screw, and the tilt member and the rotating shaft is configured to be rotated appropriately, so that the center line of the tilt member and the center line of the rotating shaft are intersected to form a variable angle, and the tilt member has a first positioning hole, and a second positioning hole, and a first relative positioning hole and a second relative positioning hole are formed at relative positions of the rotating shaft respectively, and both of the first positioning hole and the first relative positioning hole have an elastic member installed thereto, and the second positioning hole and the second relative positioning hole have another elastic member installed thereto, so that the original angle of the tilt member and the rotating shaft is maximized.

6. The swingable mechanical structure of claim 5, wherein the swingable mechanical structure is assembled with a support base, a seat, an armrest, and two stepping members, and when the two stepping members are stepped, the seat produces a sideway swing with respect to the machine base by the swing mechanism.

7. The swingable mechanical structure of claim 6, wherein a transmission mechanism is installed onto the support base and comprised of a driving belt, and a flywheel, and the driving belt is coupled to the flywheel and one of the stepping members, and the two stepping members are stepped to drive the driving belt to link and rotate the flywheel.

8. The swingable mechanical structure of claim 1, wherein the swingable mechanical structure is assembled with a support base, a seat, an armrest, and two stepping members, and when the two stepping members are stepped, the seat provides a sideway swing with respect to the mechanical base by the swing mechanism to produce a complete exercise equipment.

9. The swingable mechanical structure of claim 8, wherein a transmission mechanism is installed onto the support base, and the transmission mechanism is comprised of a driving belt and a flywheel, and the driving belt is coupled to the flywheel and one of the stepping members, and the two stepping members are stepped to drive the driving belt to link and rotate the flywheel.

10. The swingable mechanical structure of claim 1, wherein the tilt member is integrally formed.

11. The swingable mechanical structure of claim 1, wherein the tilt member is comprised of two separate components.

* * * * *